Patented Mar. 19, 1940

2,194,438

UNITED STATES PATENT OFFICE 2,194,438

DISPOSAL OF WASTE CYANIDE SOLUTIONS

Christian J. Wernlund, North Tonawanda, N. Y., and Michael J. Zunick, West Lafayette, Ind., assignors to E. I. du Pont de Nemours & Company, Wilmington, Del., a corporation of Delaware No Drawing. Application October 21, 1938,
Serial No. 236,296

9 Claims. (Cl. 210—2)

This invention relates to a process for the disposal of waste liquids, more particularly to the disposal of cyanide containing waste liquids.

Treatments with cyanide containing liquids are used for various purposes in industry. Thus cyanide containing baths have found wide application in the art of electroplating with metals such as more particularly with copper and zinc. Cyanide containing baths have also found considerable application for cleansing processes for metals. In many other cases industrial application of cyanide baths have been hindered or entirely prevented because of the lack of convenient and economical means of converting the residues to a harmless form for safe disposal in sewage systems, lakes or streams.

Numerous reactions for the conversion of cyanides to non-toxic substances are known. However, only a few of these reactions have found technical application for the conversion of cyanide residues into non-toxic form, since the conditions prevailing in waste liquids containing cyanide residues and in the laboratory are entirely different. Waste liquids containing cyanides usually contain the cyanide only in small concentrations, thus offering very unfavorable equilibrium conditions for further decomposition. Therefore, many reactions which are applicable to transform pure cyanides or concentrated cyanides substantially into harmless or non-toxic forms, respectively, cannot be utilized for the purpose in mind. Moreover, such waste liquids often contain complex cyanide salts of heavy metals which due to their little ionization can be reacted only with difficulty to complete decomposition.

For the disposal of waste liquids containing cyanides heretofore mostly the ferrous sulfate method has been used. According to this method the waste liquid is treated with ferrous sulfate with or without the addition of alkali. This reaction, however, is not quantitative and this especially with waste liquids containing complex heavy metal cyanide salts. Another method which has found industrial application is the treatment of the waste liquors with sulfuric acid so as to form hydrocyanic acid which is collected as vapor. To remove all the hydrocyanic acid it is necessary to bubble air through the solution for a number of hours. This method of course necessitates special equipment for disposing of the hydrocyanic acid vapors in a suitable way. It is also known that potassium permanganate together with sulfuric acid is a suitable means to completely decompose cyanide solutions. However, large excesses of these reagents are necessary so that this process is impracticable because of its high cost. Various other methods have been suggested but did not find any considerable practical application.

An object of the present invention is a practicable process for converting waste cyanide solutions to relatively harmless compounds which may be safely discharged into the sewer. Another object of the present invention is to provide a process for converting waste cyanide solutions containing complex heavy metal cyanides such as sodium cupracyanide or sodium zinc cyanide to relatively harmless compounds which may be safely discharged into the sewer. Further objects of the invention will be hereinafter apparent.

The objects of our invention are accomplished by treating waste liquids containing cyanides with elemental sulfur or substances containing sulfur in the polysulfide form, under alkaline conditions. It has been found that by this method or not only the simple cyanides but also poisonous complex heavy metal cyanides can be substantially completely converted to thiocyanates, or in the case of complex heavy metal cyanides to thiocyanates and insoluble heavy metal compounds. It has been further found that the ferrocyanides, which are non-toxic, do not react with the above specified group of reagents, so that wherever in a waste liquid non-toxic ferrocyanides are present only a small quantity of the reagents is necessary to convert other cyanides present without any of the reagents being lost by unnecessary reaction with the ferrocyanides. The process of the present invention has the further advantage that only a moderate excess of sulfur over the amount theoretically necessary for converting the cyanides is necessary for reducing the cyanide content of the solution to amounts sufficiently low for the safe disposal of the waste liquors. The method of our invention also offers the advantage that the reaction velocity for the conversion of the cyanides with compounds containing sulfur in the polysulfide form is sufficiently rapid for economical commercial operation.

By the herein described process, it is possible to reduce the cyanide content of cyanide waste liquors (calculated as NaCN) to concentrations considerably lower than four parts per million, e. g., one part per million, or less. Liquors having such low cyanide concentrations can safely be disposed of in ordinary sewage systems or in lakes or streams with little or no danger to animal life or fish in the waters affected. Usually, we prefer to reduce the cyanide content to not more than one part per million before discarding the waste liquor. However, the maximum cyanide content of the liquor to be discarded for safe disposal will depend on various circumstances such as the extent of dilution at the place where discarded and the location of that place, as will be apparent to the sanitary engineer.

The group of substances which may be used for our invention includes elemental sulfur and water soluble compounds which contain sulfur in the polysulfide form; that is, compounds in which sulfur atoms are inter-connected with other sulfur atoms and therefore are in a highly reactive form. Thus, for example, the water soluble metal polysulfides, such as alkali polysulfides (including ammonium polysulfide), alkaline earth metal polysulfides, and alkali metal polythionates, all of which are water soluble and contain sulfur in the polysulfide form, can be utilized for the present invention. Under the alkaline conditions which are necessary for the process of our invention it is obvious that elemental sulfur will be in a similar condition as in polysulfides and as a matter of fact always will be partially converted into a polysulfide during the reaction. Thus, in carrying out the reaction with elemental sulfur part of the sulfur may be consumed directly in the conversion reaction with the alkali cyanide, while another part will react with alkali to form sulfide and polysulfide. Apparently, either or both the free sulfur in the presence of an alkali or the polysulfide which is formed reacts with the cyanide in the desired manner. Therefore, when we state that for the reaction of our invention there should be always a slight excess in sulfur, this is meant to indicate that at the end of the reaction always at least a slight amount of polysulfide should be present, regardless whether elemental sulfur or sulfur in the form of its polysulfide compounds is used.

A convenient way of carrying out our invention consists in heating the waste liquid containing the cyanides to a temperature of above about 80° C., or preferably boiling it, while stirring with sulfur in 5 to 10% excess over the amount theoretically required, preferably in the presence of sufficient lime or other base to keep the solution alkaline, until the reaction is complete. The end po'nt of the reaction is shown by the formation of free polysulfide in the solution which may be detected by its yellow color or by the formation of a stain on a piece of bright copper immersed in the solution for a few seconds. This treatment requires usually about 1½ hours at the boiling point. According to another embodiment of our invention the waste liquid may be boiled with a slight excess of lime-sulfur (calcium polysulfide) solution until destruction of cyanide is complete. This treatment usually requires only about 3 to 5 minutes. It is also possible to treat the waste liquid with the lime-sulfur solution at room temperature which usually will require about two hours. As will be apparent to those skilled in the art, instead of lime-sulfur solution other polysulfides and instead of lime other alkaline reacting substances can be used. According to the prevailing conditions in practical application of our invention, many of the above outlined methods may be used or may be varied as will be apparent to those skilled in the art. Thus the first outlined method where elemental sulfur is used will be most economical with regard to reagent cost since it consumes only free sulfur in essentially theoretical quantity. The method where the waste liquid is boiled with a slight excess of lime-sulfur solution will be preferable where time is an important factor and this method also uses less heat than the first described method. The last described method, where the waste liquid is treated with lime-sulfur solution at room temperatures, will be preferred when the consumption of heat is a factor of prime importance. In general the reaction will proceed more rapidly the higher the temperatures used and may be raised above the normal boiling point by operating under increased pressure; however, such a procedure would involve additional expense for equipment.

While lime generally is preferred in carrying out the process of our invention, because of its low cost, it may be obviously replaced by other alkali or alkaline earth oxides or hydroxides or by ammonia or other sufficiently alkaline reacting substances. Similarly, other polysulfides may be used instead of lime-sulfur but in general are more expensive.

It has been found that the small quantity of excess sulfides and polysulfides in the treated solution will not usually be objectionable. If necessary, these compounds may be removed by adding ferrous sulfate together with enough lime or other base to keep the solution alkaline.

Our invention is further illustrated by the following examples:

*Example I*

To 2000 cc. of a solution containing sodium cyanide, sodium cuprocyanide and sodium zinc cyanide equivalent to about 20 p. p. m. NaCN, 2 cc. of lime sulfur solution (about 7% sulfur) and 5 cc. 10% NaOH were added and the mixture allowed to stand over the week-end at room temperature. After treatment, analysis showed less than 0.1 p. p. m. cyanide as NaCN remaining in the solution.

*Example II*

One liter of a solution of sodium zinc cyanide equivalent to 25 p. p. m. NaCN was treated with 0.5 cc. lime-sulfur solution (15–20% sulfur) containing excess lime, for 1¾ hours at room temperature. Analysis of the treated solution showed cyanide equivalent to 1.4 p. p. m. NaCN. Similar mixtures showed 16.4 p. p. m. cyanide after 2 minutes, 7.3 p. p. m. after 25 minutes and 3.6 p. p. m. after 45 minutes treatment.

*Example III*

One liter of sodium zinc cyanide solution equivalent to 25 p. p. m. NaCN was heated to boiling and 0.5 cc. lime-sulfur (15–20% sulfur) containing excess lime was added. The mixture was boiled 3½ minutes, then analyzed immediately; 1.3 p. p. m. and 0.7 p. p. m. cyanide were found in duplicate experiments.

*Example IV*

To about 125 gal. of solution containing sodium zinc cyanide equivalent to 37 p. p. m. NaCN, 150 cc. lime-sulfur solution (15–20% sulfur) containing excess lime was added and the mixture heated to boiling over a period of ½ hour. A sample was analyzed immediately and found to contain 1.0 p. p. m. cyanide as NaCN.

*Example V*

One gram of sodium cyanide was dissolved in one liter of water; 0.7 g. sulfur and 1 g. slaked lime were added and the mixture boiled until a bright copper wire dipped in the solution showed a sulfide stain, then 15 minutes longer. About 1 g. of ferrous sulfate was added, along with enough lime to keep the solution alkaline. The mixture was cooled and filtered. The filtrate was found to be free of sulfides and to contain 2.9 p. p. m. of NaCN.

*Example VI*

One gram of sodium cyanide and 15 g. of potassium ferrocyanide were dissolved in 1 liter of water and treated as described in Example V, omitting the addition of ferrous sulfate and lime. Analysis after treatment showed 3 p. p. m. of NaCN.

*Example VII*

One-half liter of copper electroplating solution containing about 18 oz. per gal. of cuprous cyanide and 18 oz. per gal. of sodium cyanide were boiled with 95 g. sulfur and 50 g. slaked lime, stirring continuously. Water was added as required to keep the mixture fluid, and further additions of sulfur were made until a bright copper wire dipped in the solution showed a sulfide stain. In all 110 g. sulfur was used. Excess sulfides and polysulfides were removed by means of ferrous sulfate, and the solution analyzed for cyanides. Less than 1 p. p. m. as NaCN was found.

Our invention is not restricted to the specific procedure of the above examples but is to be understood in its broad aspect as claimed in the appended claims. As stated above, any alkaline reacting substance can be used to provide the alkaline reaction medium for the reaction and instead of elemental sulfur or earth alkaline polysulfides other water soluble substances having sulfur in the polysulfide form can be used.

We claim:

1. A method for the sanitary disposal of a waste cyanide liquor which comprises reacting said liquor under alkaline conditions with a substance selected from the group consisting of elemental sulfur and water soluble compounds having sulfur in the polysulfide form until the soluble cyanide content of said liquor is sufficiently decreased for safe disposal.

2. A method for the sanitary disposal of a waste cyanide liquor which comprises reacting said liquor under alkaline conditions with a substance selected from the group consisting of elemental sulfur and water soluble compounds having sulfur in the polysulfide form until the soluble cyanide content of said liquid is decreased to the equivalent of not more than about 4 parts per million of sodium cyanide.

3. A method for the sanitary disposal of a waste electroplating solution containing a complex heavy metal cyanide which comprises reacting said liquor solution under alkaline conditions with a substance selected from the group consisting of elemental sulfur and water soluble compounds having sulfur in the polysulfide form until the soluble cyanide content of said liquor is sufficiently decreased for safe disposal.

4. A method for the sanitary disposal of a waste cyanide liquor which comprises reacting said liquor solution under alkaline conditions with a water soluble polysulfide until the soluble cyanide content of said liquor is sufficiently decreased for safe disposal.

5. A method for the sanitary disposal of a waste cyanide liquor which comprises reacting said liquor under alkaline conditions with calcium polysulfide at a temperature of from about 80° C. to the boiling point until the soluble cyanide content of said liquor is sufficiently decreased for safe disposal.

6. A method for the sanitary disposal of a waste cyanide liquor which comprises reacting said liquor under alkaline conditions with elemental sulfur at a temperature of from about 80° C. to the boiling point until the soluble cyanide content of said liquor is sufficiently decreased for safe disposal.

7. A method for the sanitary disposal of a waste electroplating solution containing a complex heavy metal cyanide which comprises reacting said liquor solution under alkaline conditions with calcium polysulfide at a temperature of from about 80° C. to the boiling point until the soluble cyanide content of said liquor is decreased to the equivalent of not more than about 4 parts per million of sodium cyanide.

8. A method for the sanitary disposal of a waste electroplating solution containing a complex copper alkali metal cyanide which comprises reacting said liquor solution under alkaline conditions with a substance selected from the group consisting of elemental sulfur and water soluble compounds having sulfur in the polysulfide form until the soluble cyanide content of said liquor is sufficiently decreased for safe disposal.

9. A method for the sanitary disposal of a waste electroplating solution containing a complex zinc alkali metal cyanide which comprises reacting said liquor solution under alkaline conditions with a substance selected from the group consisting of elemental sulfur and water soluble compounds having sulfur in the polysulfide form until the soluble cyanide content of said liquor is sufficiently decreased for safe disposal.

CHRISTIAN J. WERNLUND.
MICHAEL J. ZUNICK.